United States Patent [19]

Tomelleri

[11] 4,004,502
[45] Jan. 25, 1977

[54] ARTICHOKE SHAPING MACHINE

[76] Inventor: Giordano Tomelleri, 22 Via Montorio, I-37100 Verona, Italy

[22] Filed: July 1, 1975

[21] Appl. No.: 592,211

[30] Foreign Application Priority Data

Oct. 16, 1974 Italy .................. 84941/74

[52] U.S. Cl. .................. 99/593; 99/637
[51] Int. Cl.² .................. A23N 7/00; A47J 17/18; A23N 15/02; A47J 21/00
[58] Field of Search ........... 99/635, 636, 642, 643, 99/567, 561, 537, 588, 591, 593, 596; 82/70.2, 101, 4 C; 74/194, 206

[56] References Cited

UNITED STATES PATENTS

| 1,461,874 | 7/1923 | Guerrieri | 99/593 X |
| 1,515,607 | 11/1924 | Monks | 99/591 |
| 1,604,347 | 10/1926 | Guerrieri | 99/596 |
| 2,204,846 | 6/1940 | Dotta | 99/636 X |
| 2,217,679 | 10/1940 | Gray et al. | 99/636 X |

Primary Examiner—Harvey C. Hornsby
Assistant Examiner—Robert Pous
Attorney, Agent, or Firm—Edmund M. Jaskiewicz

[57] ABSTRACT

A rotating shaving mechanism for the preparation of artichoke hearts including a circular knife mounted at an angle to the longitudinal extension of the artichoke. The knife is rotatable on an arm mounted on a rotatable shaft to enable the knife to be rotated about the central axis of the shaft while rotating about its own axis. The shaft is mounted in a support which may be displaced towards or away from the artichoke to be prepared.

4 Claims, 5 Drawing Figures

ARTICHOKE SHAPING MACHINE

BACKGROUND OF THE INVENTION

The present invention relates to improvements to automatic and semi-automatic machines for the preparation of artichoke hearts.

In the case of the majority of machines in use, the shaping of artichoke hearts begins with the removal of the leaves, a feature which represents a serious disadvantage, since, after a short period of operation of the machine, the members provided for this purpose become clogged and it is necessary to clean them.

Subsequently, the shaping of the bottom of artichoke hearts is effected by scraping and/or milling of the outer parts of the stalk. The ease of doing this is dependent on the conditions of freshness of the artichoke, however, it is always very difficult due to the presence of very resistant fibres in the area where the sepals or leaves are attached to the stalk of the artichoke.

In order to surmount these disadvantages, an attempt has been made to shape the bottom of artichoke hearts by means of members which penetrate the stalk of the artichoke and which when the outer foliage is removed by scraping and/or external milling of the stalk, result in a considerable loss of the pulp of the stalk with consequent reduction in the commercial value of the product. In addition to this, since such members are formed by pointed blades of considerable thickness, they are very susceptible to wear and breakage after a short period of use.

SUMMARY OF THE INVENTION

The present invention surmounts these disadvantages by means of a rotating cutting device shaving the outer parts of the artichoke making it possible to avoid clogging and subsequent cleaning associated with conventional defoliating members, surmounting the difficulty of cutting the tough fibres of the sepals, also in the region in which they are attached to the stalk, by means of a cut effected obliquely relatively to the longitudinal extension of the fibres and always at the same rate for any region of the bottom of the artichoke heart.

In order to achieve these objects the mechanism which is the object of the present invention comprises jaw means for gripping the end portion of the clipped artichoke, said jaws making it possible to bring and keep the artichoke coaxial with the device shaping the bottom of the artichoke heart, said device effecting a rotating shaving cut on the upper part of the stem, practically without any appreciable loss of the pulp of the stem.

In particular, the device which is the object of the present invention produces a cut similar to that effected by the discs of normal slicing devices, which are particularly efficient, due to the rotary motion of the device on the tough fibres of the sepals even at the points where they are attached to the stem. The fibres are cut obliquely relatively to their longitudinal extension, in accordance with cutting guides for permitting an external oval shape of the bottoms of the artichoke hearts and always at the same rate for any portion of the bottom of the artichoke hearts.

BRIEF DESCRIPTION OF THE DRAWINGS

These and other objects of the present invention will become apparent from the following specific description to be considered together with the accompanying drawings illustrating a preferred embodiment of the present invention by way of example only in which.

DETAILED DESCRIPTION

Figure 1:
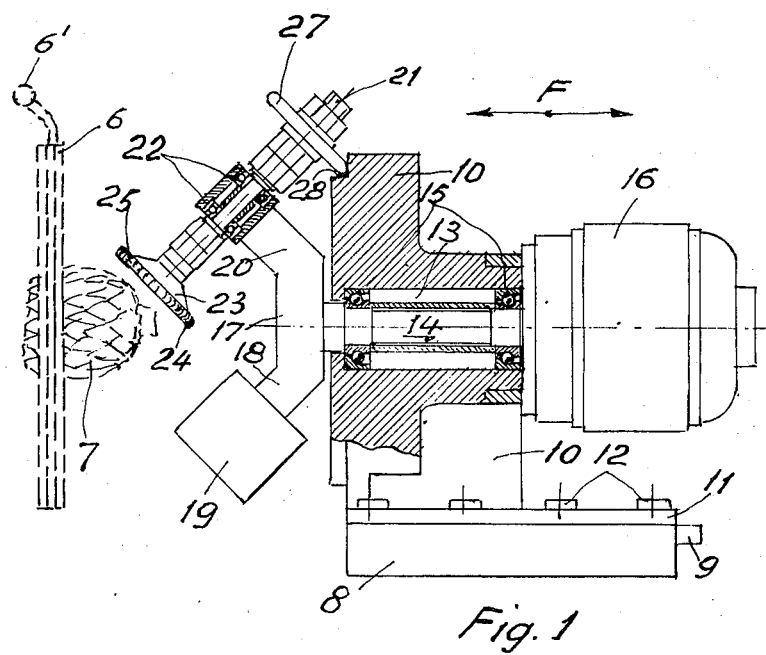
FIG. 1 shows a side view, partly in section, of the machine of the present invention.
Figure 2:
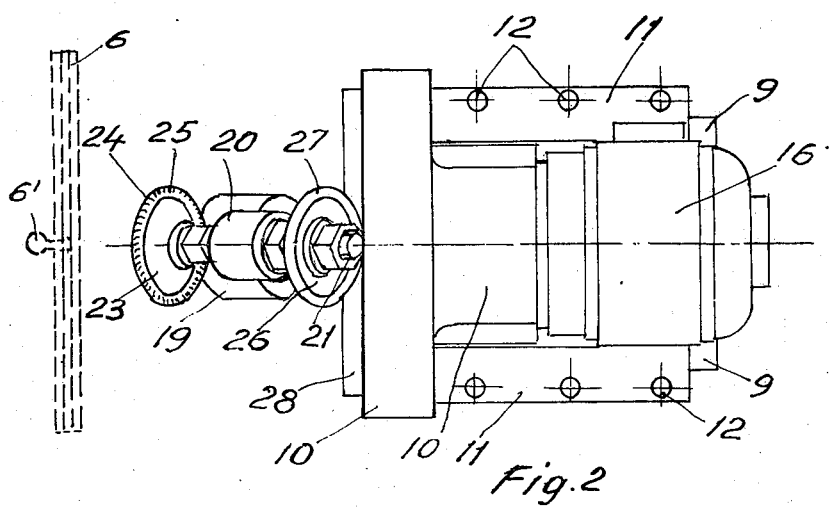
FIG. 2 shows a top view of FIG. 1, without the artichoke.

Bearing in mind that the same references in the Figures correspond to the same or equivalent parts, it will be seen that in FIG. 1 the machine comprises a locking device, formed by jaws 6, controlled by a locking lever 6' for keeping a clipped artichoke stem firmly in the desired position. This locking device is connected to a rotating plate, or a conveyor belt, having an intermittent feed drive for bringing the artichoke into line with the shaping device of the machine which operates between each intermittent movement. The shaping device is supported in a cradle 8, in which a baseplate 9 for the support member 10 for the shaping members is located. The baseplate 9 is retained on two sides by guide bars 11, secured to the cradle 8 by means of screws 12 or the like means, and can be displaced in the cradle 8 in the directions of the arrows F by means of a micrometer adjustment device (not shown), for bringing the rotating shaving members close to or away from the artichoke.

The cradle 8 forms a slide surface for the baseplate 9 of the support 10, and is rigidly connected to the machine frame (not shown).

The support 10 is provided with a hollow cylindrical seat 13 for receiving a shaft 14 mounted on ballbearings 15, or the like means, which shaft is rotatable by a motor 16 also supported on the block 10.

At its free end projecting from the block 10, the shaft 14 carries a bifurcated member 17, one arm 18 of which supports a counterweight for balancing the weight of the shaving device supported by the other arm 20. A hollow cylindrical seat is provided on the arm 20 for a spindle 21 of the shaving device mounted on ball-bearings 22 or the like means.

The shaving device includes the spindle 21 which carries a knife 23 having a circular cutting edge 24 at the end of a frusto-conical wall 25 diverging towards the artichoke to be shaped. The other end of the spindle 21 carries a wheel 26, provided with a rubber tyre 27, which is kept in constant contact with the walls of a peripheral recess 28, having an L-shaped cross section, formed in the front surface of the support block 10.

The wheel 26 with tyre 27, running in the recess 28, represents a gearing up of the spindle 21, which spindle, when the motor 16 rotates the shaft 14, has a much greater rate of revolution than the shaft 14.

Thus, the knife 23 is caused to rotate rapidly about its own axis by the spindle 21 and the whole arrangement on member 17 rotates about the axis of the shaft 14. Both the sepals and the fibres by which they are attached to the stalk of the artichoke, are cut evenly and obliquely relative to the central longitudinal axis thereof.

Figure 5:

Shaving of the artichoke is effected by advancing of the baseplate 9 and of the block 10 relatively to the cradle 8, which causes the knife 23 to cut into the bottom of the artichoke with its cutting edge 24 until the shape indicated by 7' in FIG. 5 is obtained.

Figure 3:
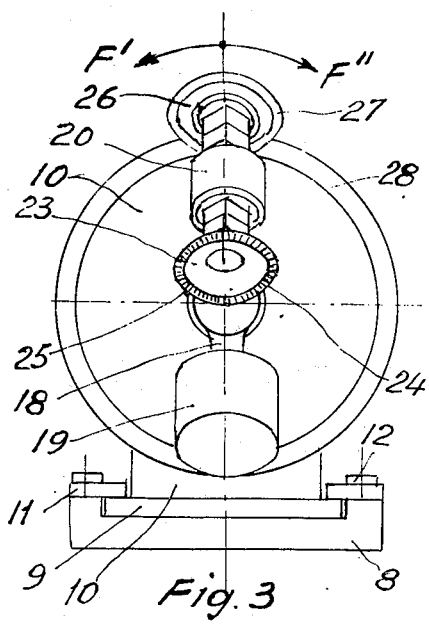
FIG. 3 is a front view of FIG. 2, the gripping jaws being removed in order to give a clear view of the device.
Figure 4:
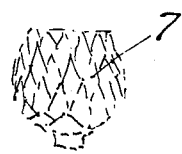
FIGS. 4 and 5 shows a clipped artichoke before the bottom is shaped and after the shaping respectively.

The rotary motion of the shaft 14 may be in either of the two directions indicated by the arrows F' and F" in FIG. 3.

In order to halve the shaping time, a rotating shaving device, similar to that provided on the arm 20, may be arranged on the arm 18 in place of the counterweight 19.

The axis of the spindle 21 has a fixed incline relatively to the axis of the shaft 14 but it is obvious that embodiments are possible in which the incline may be varied relatively to the type of artichoke to be prepared, which may have stalks of a more or less open formation. The axis of the shaft 14 is always kept tangential with the cutting edge 24 of the knife 23 and the tyre 27 is in constant frictional engagement with the recess 28.

It is obvious that, instead of bringing the operating members of the rotating chipping device close to or away from the artichoke, it is possible to bring the artichoke itself close to or away from the device or to proceed in such manner that the artichoke and the operating members of the device can mutually approach and recede from each other.

It is also obvious that the knife 23 may have a corrugated cutting edge rather than circular as shown, and may be constructed in one or more sectors without departing from the scope of the present invention. It is obvious that any form of variations made to the present invention as a practical embodiment may be considered likewise as coming within the scope of the invention, defined by the following claims.

I claim:

1. A rotating shaping machine for shaving the bases of artichoke hearts, comprising support means, a rotatable shaft mounted in said support means, at least one arm member supported on said rotatable shaft, a rotatable knife means having a frustoconical wall diverging towards an artichoke to be prepared and having a circular cutting edge, said knife means being supported on said arm member so that the axis of said shaft is tangential to the cutting edge to impart an ovoidal shape to the bottoms of the artichoke hearts, means for rotating the knife means, means for keeping the artichoke co-axial with said shaft, and means for causing one of the knife means and the artichoke to be mutually displaced towards or away from one another.

2. The machine according to claim 1, wherein the means for rotating the said knife means comprise a spindle supported on said arm member and connected to a speed multiplier, the spindle carrying the knife at its other end.

3. The machine according to claim 2, wherein the speed multiplier comprises a tyre-covered wheel connected to the free end of the spindle, which wheel is kept in constant frictional engagement with a circular recess formed in the support means and concentric with the axis of the shaft.

4. The machine according to claim 1, wherein the means for keeping the artichoke co-axial with said shaft comprise jaws for gripping the artichoke.

* * * * *